Feb. 12, 1963 V. SANTESSO 3,077,355
SAFETY DEVICE IN PASSENGER CARS, PLANES, OR THE LIKE
Filed Oct. 2, 1961 2 Sheets-Sheet 1
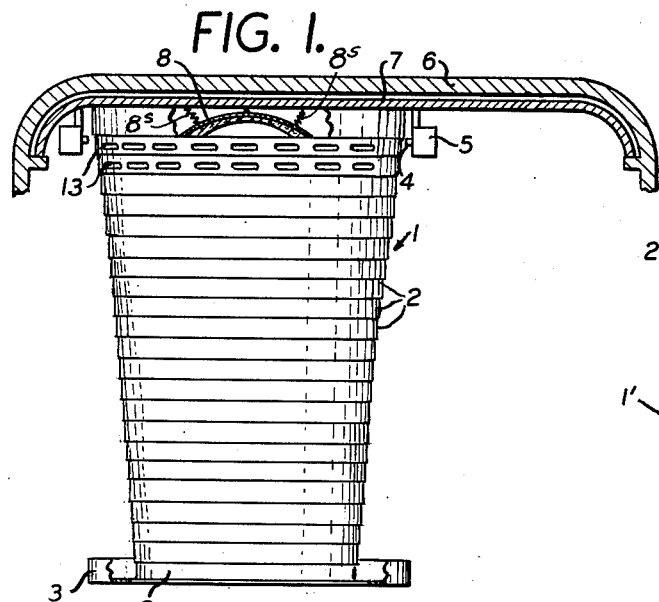
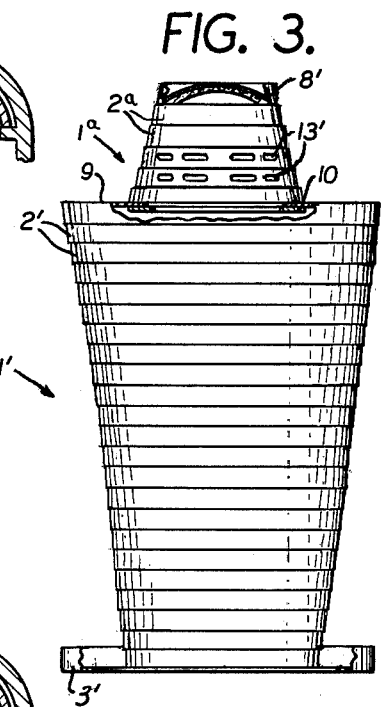
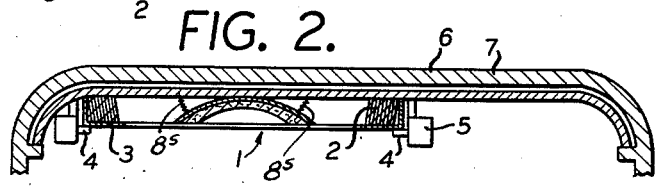
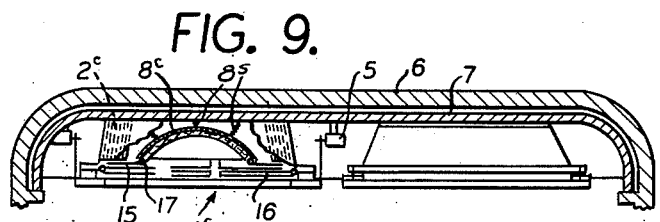
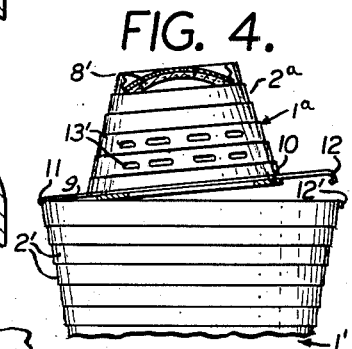
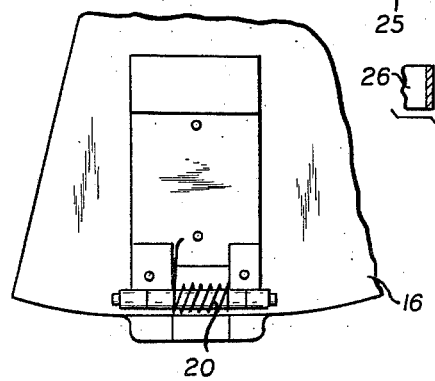
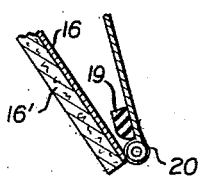
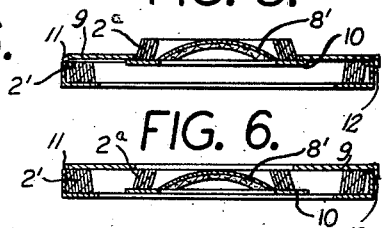
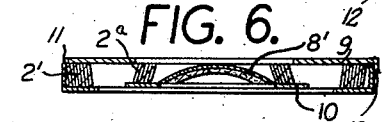
INVENTOR
VIRGILIO SANTESSO
BY
ATTORNEY.

Feb. 12, 1963 V. SANTESSO 3,077,355
SAFETY DEVICE IN PASSENGER CARS, PLANES, OR THE LIKE
Filed Oct. 2, 1961 2 Sheets-Sheet 2
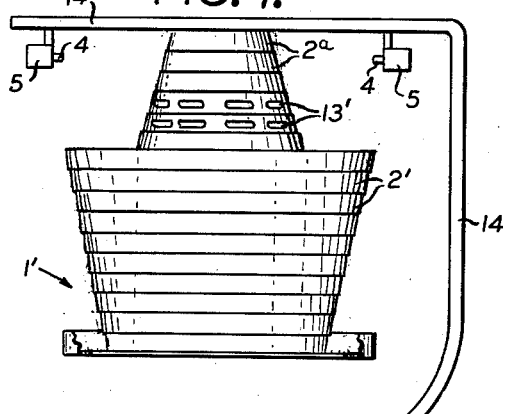
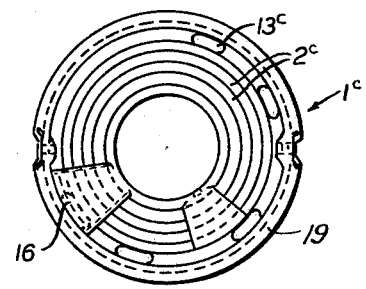
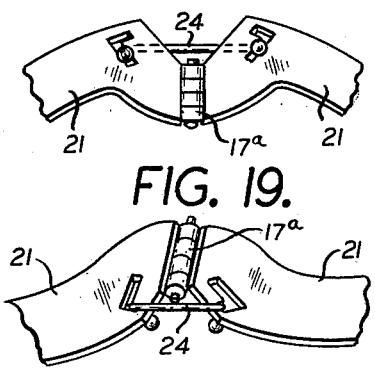
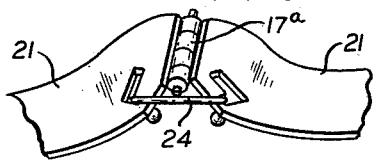
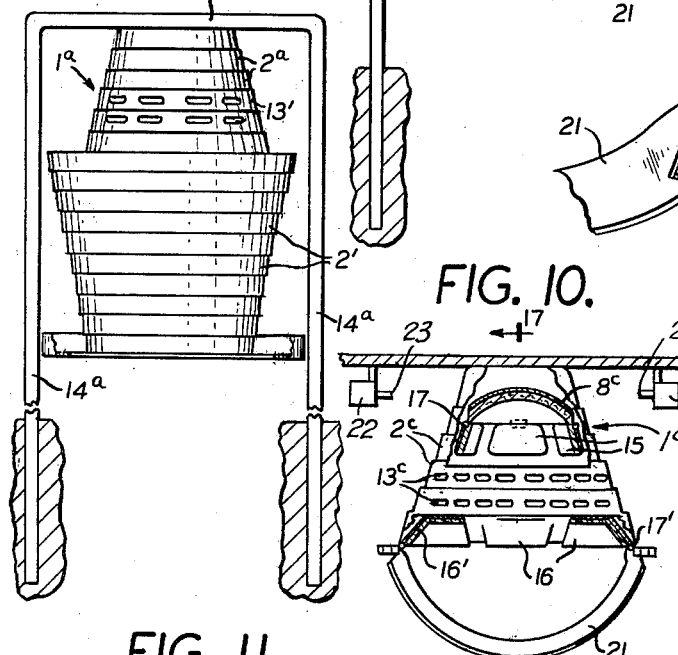
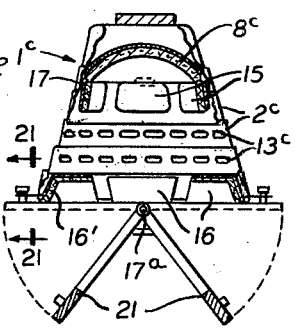
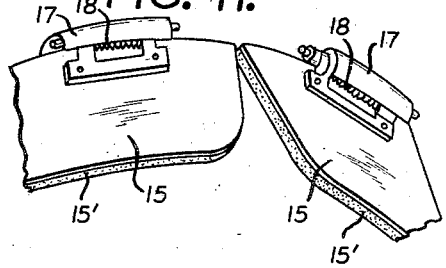
INVENTOR
VIRGILIO SANTESSO
BY
ATTORNEY.

United States Patent Office 3,077,355
Patented Feb. 12, 1963

3,077,355
SAFETY DEVICE IN PASSENGER CARS, PLANES, OR THE LIKE
Virgilio Santesso, Via Zabarella 55, Padova, Italy
Filed Oct. 2, 1961, Ser. No. 142,116
Claims priority, application Italy Oct. 4, 1960
10 Claims. (Cl. 280—150)

The present invention relates to a safety device for passengers in cars, planes or the like, in other words, is designed for the protection of passengers in any moving vehicle.

It is a well known fact that the sudden stop of any moving vehicle, either by hitting another vehicle or any other obstacle, as a wall, a pole, or the like, this sudden stop throws the driver and/or the passengers in the vehicle towards different parts thereof and causes accidents which lead to severe injuries or even death. An attempt has been made in this direction to avoid the movement of the body of the driver or of the passenger in case of a sudden stop for any reason by arranging of seat belts secured to the seat, which provide to a certain degree a protection against such movements, which, however, have been still found insufficient to avoid severe injuries.

It is, therefore, one object of the present invention to provide a safety device for passengers in cars, planes or the like, which upon a sudden unexpected stop is either released automatically or by operation of the driver, which device confines the driver within a limited space and prevents safely any movement of the body against any part inside of the car, the plane or the like.

It is another object of the present invention to provide a safety device which comprises substantially an inverted truncated cone, which can be telescoped to a very small height in its inoperative position and upon release assumes a height sufficient to surround completely the passenger in a movable vehicle.

It is yet another object of the present invention to provide a safety device which comprises substantially an inverted truncated cone, which can be telescoped into a body of small height and which is equipped at its top with a partly helmet-shaped head member, adapted to protect the head of the passenger, in case he is thrown upwardly towards the roof of the car, the plane, or the like.

It is still a further object of the present invention to provide a safety device which is secured to the roof of the car, the plane or the like at a position exactly above the seat of the passenger, or it is designed as a separate unit which, in its collapsed position, can easily be carried in a box substantially of the height of the inverted truncated cone, and particular means can be provided to secure the safety device to the inner sides of a roof of a car, plane, or the like.

It is yet a further object of the present invention to provide a safety device which comprises a truncated cone which can be moved from its collapsed position of very low height to an expanded operative position, and can be used for motor-cycles or any other small vehicles, by supporting the same on specially provided rods extending upwardly from the motor-cycle or the like, and being suspended by a cross-bar integrally formed with the rod.

It is also a further object of the present invention to provide a safety device which comprises a truncated cone, which is equipped at its upper end and its lower end with a plurality of circularly disposed safety plates which are turnable into a flat, inoperative position and swing out in its operative position, in order to provide protection in addition to that obtained by the truncated cone.

With these and other objects in view, which will become apparent in the following detailed description, the present invention will be clearly understood in connection with the accompanying drawings, in which:

FIGURE 1 is a front elevation of one embodiment of the safety device secured to the roof of a car and shown in operative expanded position;

FIG. 2 is an elevational view of the safety device shown in FIG. 1 in operative collapsed position;

FIG. 3 is a front elevation of another embodiment of the safety device;

FIG. 4 is a front elevation of the upper portion of the embodiment shown in FIG. 3, indicating a modification thereon;

FIG. 5 is a front elevation of the embodiment of the safety device shown in FIG. 3 in partly collapsed position;

FIG. 6 is a front elevation of the embodiment of the safety device shown in FIG. 3 in completely collapsed position;

FIG. 7 is a third embodiment of the safety device, particularly designed for motor-cycles or the like;

FIG. 8 is a front elevation of the embodiment of the safety device shown in FIG. 7, indicating a modification as to its support;

FIG. 9 is a front elevation of a fourth embodiment of the safety device, including safety plates, in its collapsed position;

FIG. 10 is a front elevation of the safety device disclosed in FIG. 9 in its expanded operative position;

FIG. 11 is a perspective fragmentary front view of the arrangement of the safety plates;

FIG. 12 is a bottom plan view of the safety device shown in FIG. 10;

FIG. 13 is a fragmentary bottom plan view shown at an enlarged scale of the safety plates displosed adjacent the helmet;

FIG. 14 is a fragmentary section through the safety plates shown in FIG. 13;

FIG. 15 is a top plan view of abutment means for closing a circuit releasing the safety device from its collapsed position, secured to the roof, to its operative telescoping position;

FIG. 16 is a section along the line 16—16 of FIG. 15;

FIG. 17 is an elevation, partly in section, along the line 17—17 of FIG. 10;

FIG. 18 is a fragmentary top plan view of the ring members shown in FIG. 17; and FIG. 19 is a bottom plan view of the hinge means for the ring members shown in FIG. 17.

Referring now to the drawings, and in particular to FIGS. 1 and 2, the safety device comprises an inverted truncated cone 1, which is formed by a plurality of conical rings which are telescopically connected with each other in such manner that all rings are received in the uppermost ring having the greatest diameter in the inoperative collapsed position, and each of the rings 2 is retained by its adjacent ring of slightly larger diameter in the expanded telescoped position. The lowermost of the ring members 2 has secured to its periphery an outer horizontally disposed ring member 3 bent upwardly to form a hook cross-section, designed to support all the rings 2 in the collapsed position of the cone 1, and the horizontal ring member 3 being retained in its upper inoperative position by at least one pair of oppositely disposed pins 4, projecting from an electromagnetic device 5, which is secured to the roof 6 of a car.

A crosswise disposed bar 7, secured to the inner side of the roof 6 of the car by any suitable means, is provided, and the uppermost ring member 2, having the widest diameter, is secured to the cross bar 7.

An arc-shaped member 8 in any suitable padding is arranged, in order to give sufficient protection in case the driver is thrown upwardly towards the roof of the car.

Preferably at least two of the cone rings 2 are equipped with horizontally disposed slots arranged 360° therearound, in order to provide vision to the driver, if, in case of an accident, the cone 1 is released to its operative, telescoping position, shown in FIG. 1. The arc-shaped member 8 is disposed at about the center of the uppermost ring member 2, and secured to the cross bar 7 by means of helical springs 8ˢ, so that in case of an impact the arc member, functioning like a crash-helmet, is capable of assuming an inclined position.

Referring now to FIGS. 3 to 6, a second embodiment of the safety device is disclosed, which comprises an inverted truncated cone 1' which is substantially identical with that shown in the embodiment of FIG. 1. The lowermost of the ring members 2' has secured to its periphery an outer horizontally disposed ring member 3' bent upwardly to form a hook cross-section designed to support all the rings 2' in the collapsed position of the cone 1', in the same manner as in the embodiment of FIG. 1. In this embodiment, however, the top ring 2' has secured thereto at its upper end a horizontal ring 9, to which is secured a second, non-inverted truncated cone 1ᵃ which consists, in similar manner as the cone 1', of a plurality of rings 2ᵃ which also fit into each other and are of smaller diameter in upward direction.

The lowermost of the ring members 2ᵃ has secured to its bottom a horizontal ring member 10, the outer diameter of which is larger than the inner diameter of the horizontal ring member 9, so that the truncated cone 1ᵃ is capable of moving into the truncated cone 1', yet, cannot move out thereof, since the upper face of the ring 10 abuts the inner face of the horizontal ring member 9.

An arc-shaped member, likewise equipped with padding 8', is in this embodiment rigidly secured to the uppermost of the ring members 2ᵃ and functions again like a helmet to provide a proper protection, in case the driver is thrown upwardly in case of an accident.

As a further modification of the embodiment shown in FIG. 3, the horizontal ring member 9 may be equipped with a hinge 11 at one side and with a catch member 12 on the other side, diametrically opposite from the hinge 11, the hinge 11 being secured to the horizontal ring 9, as well as to the upper end of the uppermost ring members 2' of the truncated cone 1', while the catch member is received by a complementary member 12' provided on the top edge of the uppermost ring member 2'. This arrangement permits a lifting of the upper cone 2ᵃ from the lower cone 1'.

As clearly shown in FIGS. 5 and 6, the upper cone 1ᵃ can be collapsed into the lower cone 1', and in such position it may be carried in a circular box having a diameter complementary to the outermost diameter of the ring members 2'.

Referring now to FIGS. 7 and 8, it will be quite apparent that the embodiment shown in FIGS. 3 and 4 can be also applied either to bicycles or to other small two- or three-wheel vehicles.

The arrangement of the two cones, namely of a lower inverted truncated cone 1' and an upper non-inverted truncated cone 1ᵃ, is substantially identical with said shown in FIGS. 3 and 4. Some of the ring members 2ᵃ are preferably equipped with, for example, slots 13', similar to the slots 13 in the embodiment of FIG. 1, in order to provide vision for the driver in the safety device.

In the embodiment of FIG. 7, a single supporting rod 14 is provided, which consists of a vertical post properly secured in the vehicle and terminating at its upper end into a horizontal bar 14'. The uppermost of the ring members 2ᵃ is rigidly secured to the cross bar 14'.

In the modification of FIG. 8, an arrangement similar to that of FIG. 7, is provided, with the exception, however, that two supporting rods 14ᵃ are arranged, which are connected at their upper end with a cross bar 14ᵇ. The uppermost ring member 2ᵃ of the upper truncated cone is here rigidly secured to the cross bar 14ᵇ.

The same release means pointed out in connection with the embodiment of FIG. 1 can also be provided in the embodiments of FIGS. 7 and 8, in order to release the safety device from its upper collapsed position into its lowered, telescoping operative position.

Referring now to FIGS. 9–12, a further embodiment is disclosed therein, which is substantially identical with the embodiment disclosed in FIGS. 1 and 2, with the exception, however, that additional safety plates are secured at the lower end of the truncated cone, as well as adjacent the arc member, to provide a greater protection for the head of the driver in case of an impact.

As clearly shown in FIG. 10, the safety device comprises here a truncated cone 1ᶜ consisting of a plurality of conical rings fitting into each other, to be permitted to assume a flat collapsed position or a telescoping, operative position, in which again each of the conical ring members 2ᶜ of lower diameter fits into the corresponding adjacent conical ring member 2ᶜ of slightly larger diameter. Some of the conical ring members 2ᶜ are again equipped with horizontal slots 13ᶜ, in order to provide vision for the rider over whom the safety device has been released.

As clearly shown in FIGS. 10 and 17, safety plates 15 are hingedly secured to the circular edge of the arc member 8ᶜ, which carries a plurality of such safety plates 15, and which are hinged in such manner that they are capable of assuming an inclined, downwardly directed position, as well as a horizontal position in collapsed position of the safety device. In addition, a plurality of safety plates 16 are disposed in the lowermost of the conical ring members 2ᶜ, which are capable of assuming a horizontal position in the collapsed position of the safety device, as well as in inclined position in the telescoping, expanded and operative position. The safety plates 15, operating like fins, are secured to the edge of a spherical cup 8ᶜ by means of hinges 17, and retained in operative position by springs 18, the safety plates 15 being adapted to increase the surface of the spherical cup 8ᶜ, and for this purpose the inner face of each of the safety plates 15 is equipped with a padding 15'.

The safety plates 16 secured to the lowermost of the conical ring members 2ᶜ having the largest diameter, are likewise equipped with paddings 16'. The safety plates 16 have the additional function to support the conical ring members 2ᶜ and the helmet in the collapsed position of the safety device. Rubber rings 19 are secured to the faces of the lowermost conical ring member 2ᶜ, to provide a resilient abutment for the fins in their collapsed position. The hinges 17' for the safety plates 16 are equipped with springs 20, to urge the plates into their collapsed position.

The safety plates 15, secured to the arc-shaped member 8ᶜ, are held by the hinges 17 for the purpose to hold them at a given level which will facilitate the operation.

Preferably two of the conical ring members 2ᶜ are equipped with slots 13ᶜ to provide vision for the driver surrounded by the safety device.

Two semi-circular members 21 are hingedly connected at the lower edge of the lowermost conical ring member 2ᶜ, in order to provide additional safety means which in operative position, as shown in FIGS. 10 and 17, extend at an acute angle from the horizontal plane formed by the lowermost conical ring member 2ᶜ, so that a protection bar is created in front of the chest and behind the back of the rider.

Any suitable means can be provided in order to release the safety device from its collapsed position into its operative, telescoping position. An electromagnetic device 22 is secured to the cross bar 7, attached to the roof of a car on opposite sides of the safety device, and a pin 23 extends from each of the electromagnet devices to support the horizontal ring member 3 in collapsed position of the safety device. Upon closing the electric circuit by manually operated means, or by automatic means, it is easily obtained that the electromagnetic device block withdraws the pin 23 and permits the lowering by gravity of the respective conical ring members 2c, and in the embodiments of FIGS. 10 and 17 also of the safety plates 15 and 16 and the semi-circular members 21.

The opening of the semi-circular members 21 can be limited by a clamp member 24, as shown in FIGS. 18 and 19, which is a connecting rod limiting the angle between the two semi-circular members 21.

The releasing circuit for the electromagnetic device 22 can be operated manually or, as shown in FIGS. 15 and 16, an impact contact can be provided by bending the contact bar 25 towards the second contact bar 26, whereby a conventional electromagnetic circuit (not shown) is closed, and thereby releases the safety device from its collapsed position into its operative, telescoping position. The contact bars 25 and 26 are disposed in the electric circuit for the electromagnetic device 22 and become operative upon a sudden stop of the vehicle.

While I have disclosed several embodiments of the present invention, it is to be understood that these embodiments are given by example only and not in a limiting sense, the scope of the present invention being determined by the objects and the claims.

I claim:

1. A safety device for passengers in cars, planes or the like comprising at least one truncated cone consisting of a plurality of conical rings telescoping into each other to assume an inoperative, flat retracted position and an operative extended position, respectively, means for suspending releasably said conical rings, means for releasing said suspending means to permit lowering of said respective conical rings by gravity to telescope into each other, a spherical body resiliently suspended in the uppermost of said conical rings, padding means secured to the inner bottom face of said spherical body, and the lowermost of said conical rings carrying a horizontally disposed ring member to cooperate with said suspending means in the collapsed, inoperative position of said safety device.

2. The safety device, as set forth in claim 1, wherein the largest of said conical rings is disposed on the top and the smallest of said conical rings is disposed on the bottom of said truncated cone.

3. The safety device, as set forth in claim 1, wherein said truncated cone is inserted and includes a second non-inverted truncated cone, the latter consisting of a plurality of conical rings of a diameter smaller than that of said conical rings of said first mentioned truncated cone, said second cone collapsing into said first mentioned cone, and the conical ring of largest diameter of said first mentioned cone being disposed adjacent the conical ring of largest diameter of said second cone.

4. The safety device, as set forth in claim 3, which includes hinge means secured to said conical ring of largest diameter of said first mentioned cone for hingedly connecting said second cone to said first mentioned cone.

5. The safety device, as set forth in claim 1, wherein said suspension means comprises a cross bar adapted to be secured to the roof of a vehicle, and the uppermost of said conical rings being rigidly secured to said cross bar.

6. The safety device, as set forth in claim 1, wherein said suspension means comprises a supporting rod adapted to be secured to a vehicle and extending upwardly to terminate with a substantially horizontally disposed cross bar, the uppermost of said conical rings being rigidly secured to said cross bar.

7. The safety device, as set forth in claim 1, wherein said cone has said ring of smallest diameter at the top thereof and said ring of largest diameter at its bottom.

8. The safety device, as set forth in claim 1, which includes a plurality of safety plates hingedly connected peripherally along the edge of said spherical body, said safety plates assuming a downwardly inclined position in its operative position and a substantially horizontal position in the collapsed, inoperative position of said safety device, padding means secured to the inner face of said safety plates, the latter being adapted to increase the protection zone of said spherical body.

9. The safety device, as set forth in claim 1, which includes a plurality of safety plates hingedly secured to the lower edge of the lowermost of said conical rings and extending into said cone in its operative position and assuming a substantially horizontal position in the collapsed, inoperative position of said safety device, said safety plates simultaneously supporting said conical rings in said inoperative position.

10. The safety device, as set forth in claim 1, which includes two semi-circular members hingedly connected to the lower edge of the lowermost of said conical rings, and assuming an inclined position relative to each other in its operative position, to protect the chest and the back of a passenger in a vehicle, and assuming a substantially horizontal position in a common plane in its inoperative, collapsed position, and means for retaining said semi-circular members in said horizontal position.

References Cited in the file of this patent

UNITED STATES PATENTS

| | | |
|---|---|---|
| 1,154,627 | Hall | Sept. 28, 1915 |
| 2,025,822 | Pryor | Dec. 31, 1935 |
| 2,827,004 | Luce et al. | Mar. 18, 1958 |
| 2,833,554 | Ricordi | May 6, 1958 |
| 2,931,665 | Sandor | Apr. 5, 1960 |